United States Patent [19]

Pittinger, Sr. et al.

[11] 4,125,339
[45] Nov. 14, 1978

[54] RELEASABLY INTERLOCKED, ASSYMMETRICAL, LUGGED FLANGE JOINT WITH FIXED RELATIVE ORIENTATION

[76] Inventors: Charles B. Pittinger, Sr., Rte. 1, Box 68, Weatherford, Tex. 76086; Charles B. Pittinger, Jr., 320 Cockeys Mill Rd., Reisterstown, Md. 21136

[21] Appl. No.: 811,285

[22] Filed: Jun. 29, 1977

[51] Int. Cl.$^2$ .............................................. B25G 3/00
[52] U.S. Cl. .................................. 403/348; 403/335; 403/353; 248/222.3
[58] Field of Search ............... 403/348, 353, 317, 343, 403/335; 362/226, 457; 248/222.3; 285/360, 376, 401; 220/301, 302, 293

[56] References Cited

U.S. PATENT DOCUMENTS

| | | | |
|---|---|---|---|
| 1,786,722 | 12/1930 | Reid ...................................... | 220/301 |
| 2,110,135 | 3/1938 | Douglas ............................... | 362/226 |
| 2,283,974 | 5/1942 | Dillon ................................. | 403/335 X |
| 2,992,323 | 7/1961 | Fletcher ............................. | 362/226 X |
| 3,600,735 | 8/1971 | Jerabek .............................. | 403/348 X |
| 3,724,237 | 4/1973 | Wood ................................ | 403/348 X |

FOREIGN PATENT DOCUMENTS 2,440,186   3/1976   Fed. Rep. of Germany ........ 248/222.3

*Primary Examiner*—Wayne L. Shedd
*Attorney, Agent, or Firm*—John F. McClellan, Sr.

[57] ABSTRACT

A two-part quick-attach detachable, triple-locking connection providing for "two-handed" assembly of cutter-shields to housings in mass production of filament trimmers and the like but requiring "three-handed" disassembly to insure safety in subsequent use of the filament trimmer. An embodiment includes: (1) a housing with a circular interrupted-flange male connection around the lower end periphery, and (2) a shield with a complementary circular interrupted-flange female connection for coaxially yielding to the male flange and, after yielding, for locking to it by a half-turn of relative rotation. The locking is by means of a plurality of inwardly-directed flexible locking fingers, located in the flange interruptions of the female connection and being of a length to snap down into the flange-interruptions of the male connection and prevent unlocking counter-rotation of the male and female connections when they are assembled together. Preferably the locking fingers have a portion with thickness greater than the female flanges which makes locking even more secure, prevents upside-down assembly and helps molding fabrication of the shield. Adjacent the locking fingers may be a plurality of somewhat similar but shorter guiding fingers establishing and maintaining coaxiality of the housing and shield during the initial stages of the coaxial yielding and relative rotation during assembly, and also during the converse late stages of disassembly which requires up-bending of two widely separated locking fingers while simultaneously counter-rotating the housing and shield. Asymmetrical disposition of interrupted flange and finger structure in an embodiment prevents improper assembly.

24 Claims, 8 Drawing Figures

RELEASABLY INTERLOCKED, ASSYMMETRICAL, LUGGED FLANGE JOINT WITH FIXED RELATIVE ORIENTATION

This invention relates generally to connectors and specifically to twist-lock connectors. In the prior art twist-lock flanged connectors and the like have been known, commonly employing axial movement of one part with respect to the other for post-twist locking, as in socket-and-bulb electrical connections. It is also realized that flange-connectable parts employing rotation can be held against unlocking rotation by an external threaded-ring as in some electrical connectors.

However, connection of mass produced relatively larger components, particularly of thermoplastic, presents different problems of weight, stiffness, cost, complexity, reliability, appearance and function from those of electrical connections, as, in the present example, in assembly-line connection of filament trimmer motor housings with respective safety shields which guard the user against flying debris during cutting.

Not only must a filament trimmer housing-to-shield connection in accordance with objects of the present invention be lightweight, low cost, simple, durable and reliable, attractive in appearance, adaptable to various materials and safely shielding in operation; it must also in accordance with objects of this invention be capable of two-second, two-hand manual assembly, so to speak, without the use of tools while being tamper-proof but positive in diassembly to discourage users from removing the safety shield, yet permitting disassembly by authorized repairmen without the use of tools.

Further objects are to provide a system as described which is failsafe in having a plurality of independent lockings providing at diametrically opposed locations successive rotational securance practically ruling out accidental release of all at the same time, but making possible skillful "three-handed" simultaneous release of all at the same time.

Still a further object is to provide a system as required which affords to the knowledgeable a relatively easy mode of deliberate successive-release as compared with the simultaneous release.

And yet a further object is to provide a system as described which has asymmetry in rotational relation of the parts preventing mis-assembly.

The above and other objects and advantages of this invention will become more apparent on examination of the following description, including the drawings in which like reference numerals designate like parts:

FIG. 1 shows the invention embodied at 10 in a vegetation filament-trimmer having a first part or motor housing 20 and a second part or debris shield 22, shown disassembled but in assembled orientation.

Figure 1:
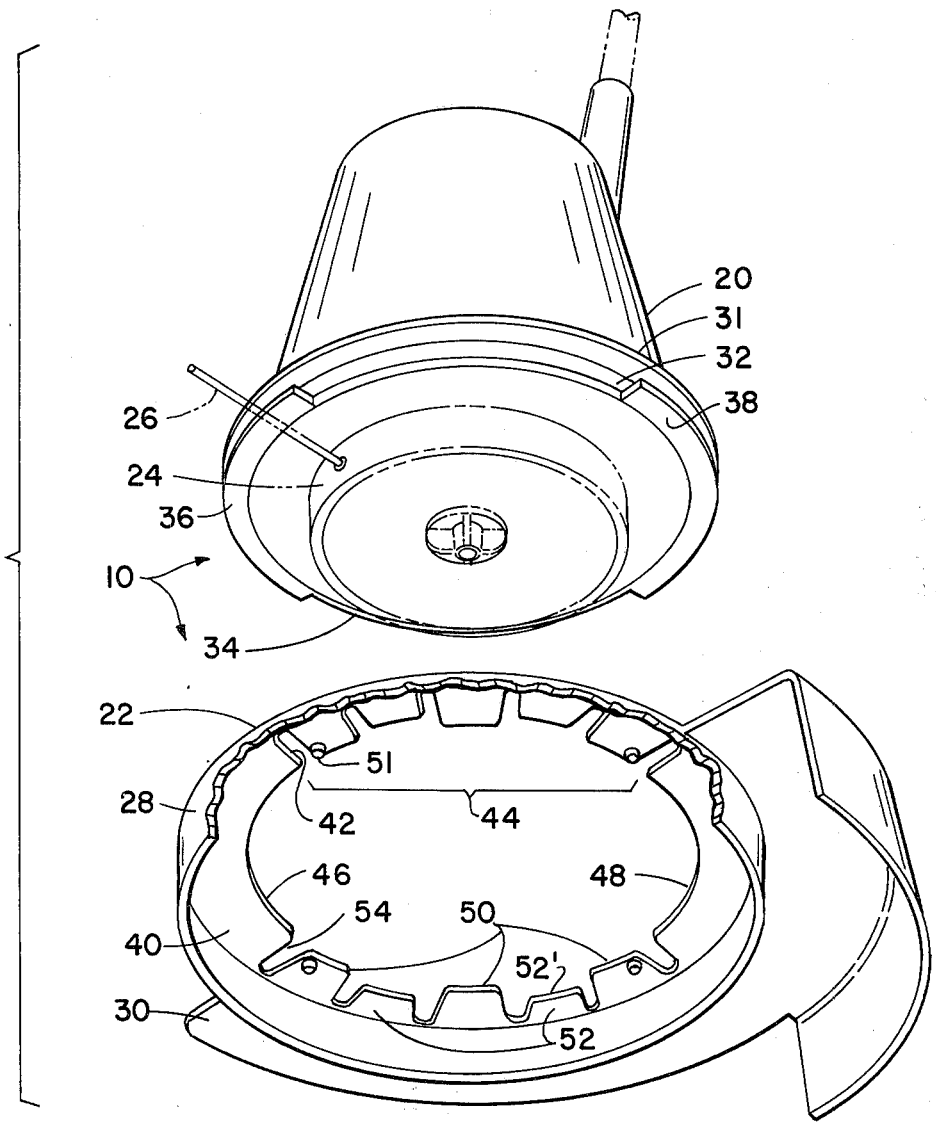
FIG. 1 is an exploded isometric view of parts of an embodiment of a filament trimmer employing this invention.

Assembly requires, as will be seen, rotating the two parts to a different relative orientation, forcing them together axially, and then rotating them to the assembled orientation shown.

Cutter head 24 (phantom lines) which mounts the filament 26 for drive by the motor is not a part of this invention and may be of any suitable size, either requiring or not requiring assembly subsequent to assembly of the housing and shield.

Similarly, the shield preferably includes a downward ring 28 concentric with and beyond the cutter head but above the filament swing, and a skirt 30 around the oncoming-sweep side and the rear.

The motor housing has a circular bottom periphery terminating below a backup ring 31, for the skirt when attached, in flanging structure or male flange structure having plural interruptions 32, 34 defining plural outwardly radial flanges 36, 38.

The shield includes an apertured, generally planar portion 40 having an inner perimeter providing inward of female flanging structure or female flange structure 42 complementary to the male flanging structure of the motor housing for coupling with it. Areas like that designated at 44 may be considered as interruptions dividing the flanging structure into plural flanges 46, 48. In each interruption, in the preferred embodiment, a set of three locking fingers 50 protruding radially inwardly and axially to some extent relative to the motor housing flanges provides means for preventing accidental disassembly through relative rotation of the parts after assembly. Upstanding knobs as at 51 provide a contour through the extra thickness which by axial offset relative to the flange structure prevent upside down assembly. Between each locking finger of each set, a guide finger 52 may be provided; these protrude in similar manner to and generally in plane with each locking finger, but only protrude as far as periphery of the motor housing flanges. Each of the inner ends 52' of the guide fingers preferably has a concavity contoured for guiding on the motor housing flange periphery.

Slots 54 separate the fingers from each other and the flanges of the shield structure.

"Nylon," ABS and polypropylene thermoplastic or the like are suitably rigid for the shield and housing and are resilient as required for biasing the relatively thin, flat locking fingers into plane after flexure.

As will be seen next, the locking fingers must flex axially away from the housing flanges when the housing and shield are forced together axially in the first assembly step, and must bias or be biased into the housing flange interruptions when the housing and shield are relatively rotated in the second and final assembly step.

Figure 2:
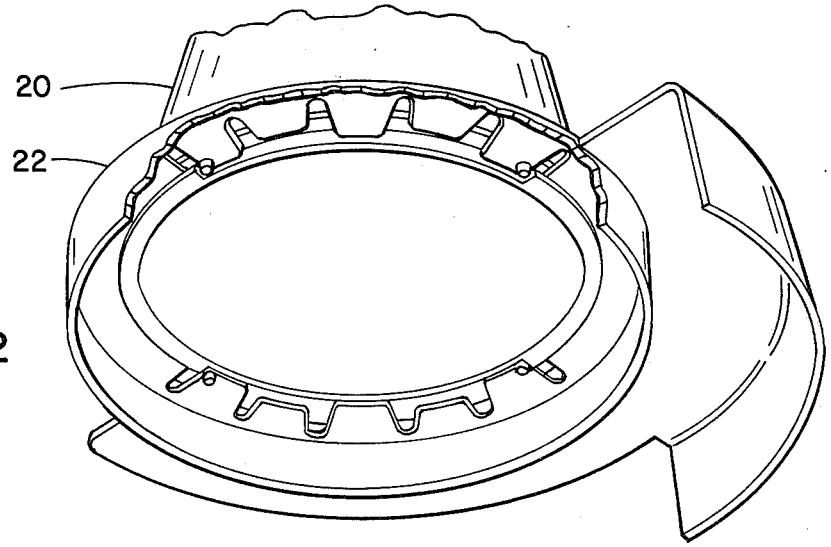
FIG. 2 is an assembled view of the same parts.

FIG. 2 shows the assembled relation of the housing and shield 20, 22 by means of the associated flange and finger structures.

ASSEMBLY STEPS

Figure 3:
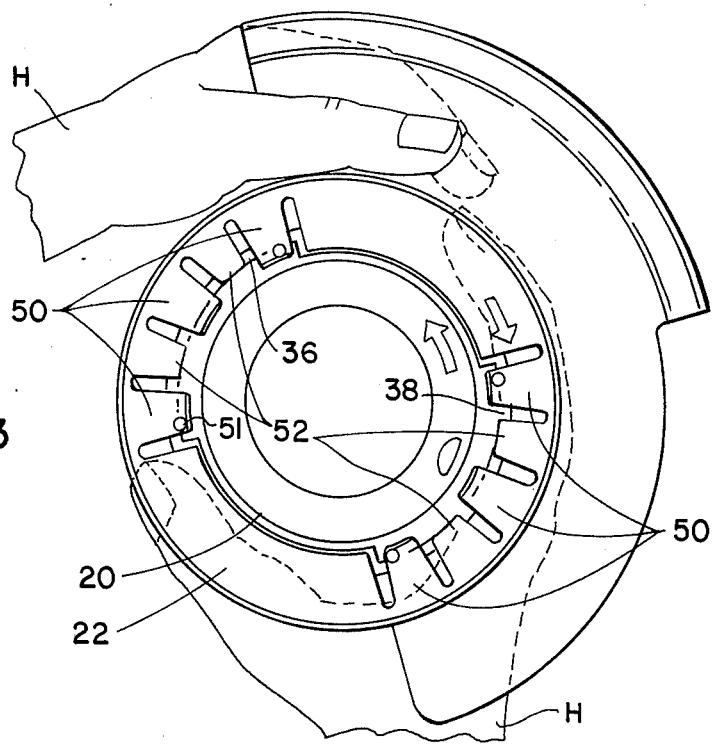
FIG. 3 and FIG. 4 are bottom plan successive views respectively of initial and final positions of assembly of details of the previous Figures.

FIG. 3 shows the first position of assembly with the locking fingers 50 oriented over and flexed up by pressure against the housing flanges 36, 38 and the guide fingers 52 guiding on the housing flange and centering the contact as the housing 20 and shield 22 are forced together.

Figure 4:
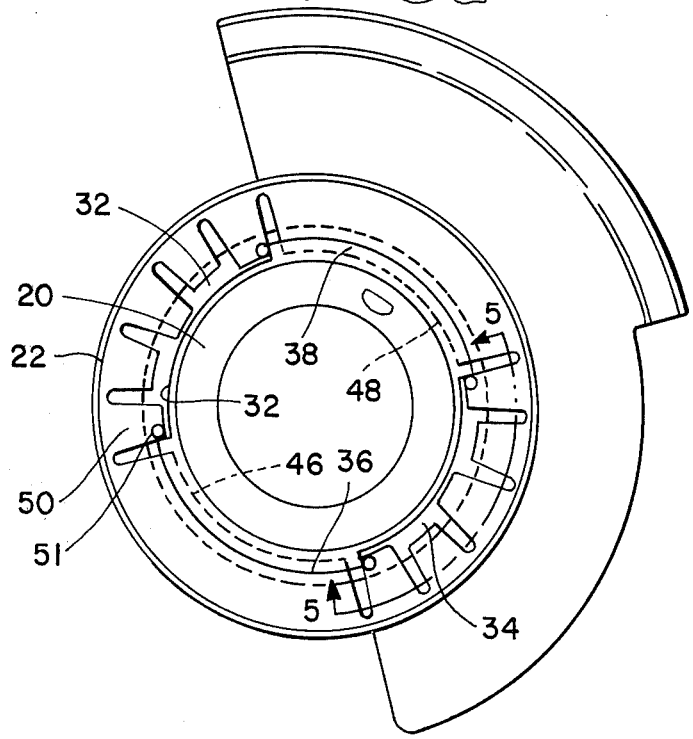

FIG. 4 shows the next and final step of assembly; rotation of the housing 20 relative to the shield 22 while the axial pressure is maintained, so that the shield flanges 46, 48 pass behind the housing flanges 36, 38 and the locking fingers 50 of the shield pass into position over and bias into plane in the housing flange interruptions 32, 34 at 51.

It will be evident that for this assembly axial pressure can be applied by holding the housing in one hand and the shield in the other and that the parts can then be relatively rotated without changing grip to complete the assembly. No other tools than two hands are necessary and the parts can be connected in as little as two seconds in production. If desired, rotation can be made in either direction to assemble (or to disassemble as will be seen).

Figure 5:
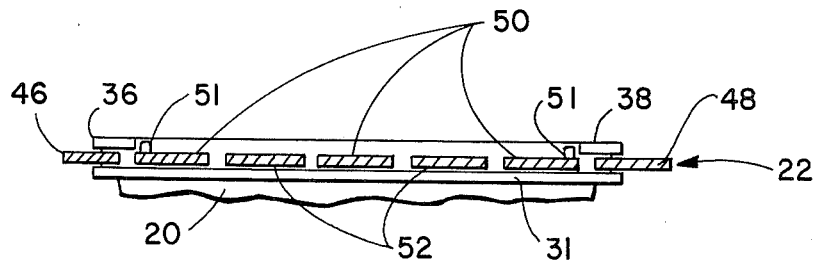
FIG. 5 is a view taken at 5—5, FIG. 4.

FIG. 5 shows a developed section through the locking fingers 50 and the guide fingers 52, also showing the flanges 36, 38 of the housing 20 and the flanges 46, 48 of the shield 22, in the locked-together position, and the backup ring 31 integral with the housing.

Figure 6:
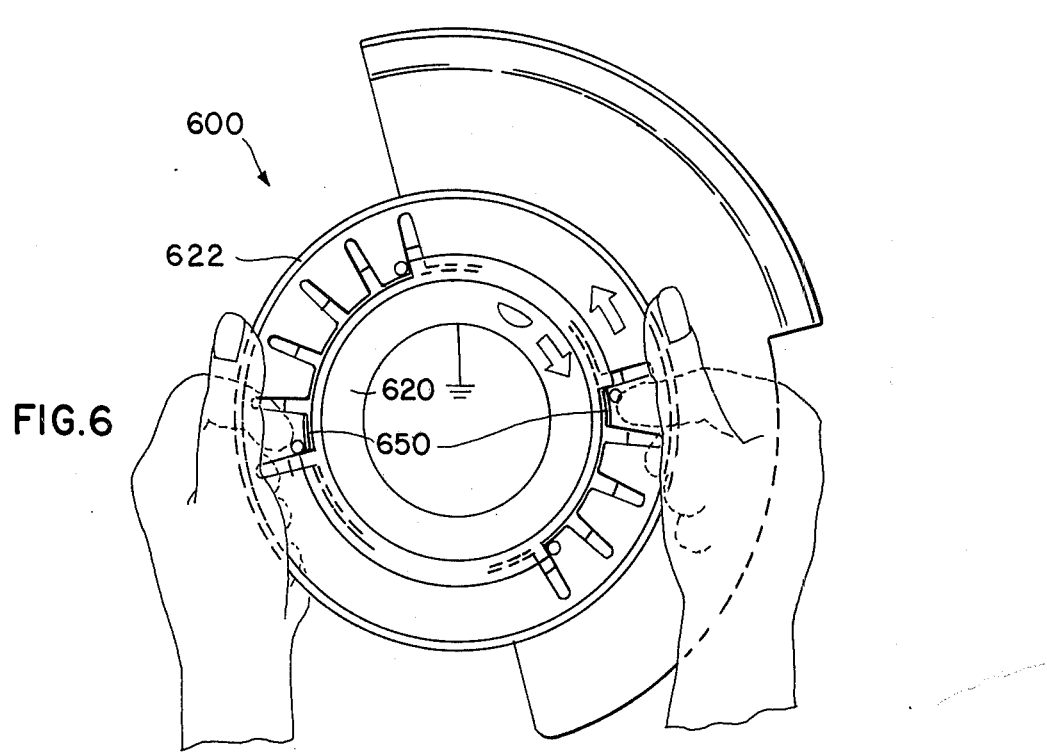
FIG. 6 is a view like FIG. 4, showing a typical initial step in disassembly but of a second embodiment.

FIG. 6 shows in asymmetrical, all guide finger embodiment 600, a first step in disassembly, typical of all embodiments, the simultaneous lifting of the indicated two of the locking fingers 650, positioned in opposed interruptions of the housing flanging in such locations as, when lifted, to permit limited relative rotation of the housing and shield.

The simultaneous lifting of locking fingers is a "three-handed" operation in that the next step, relative rotation of the housing 620 and shield 622 requires gripping and twisting of shield relative to the housing while the two locking fingers are held in the lifted position. This is best done with the housing immobilized by a clamp or the like represented by the mechanical-grounding symbol, and passes the lifted locking fingers safely over the housing flanges. Successive stages of disassembly require similar lifting and twisting to free the other locking fingers in turn. Obviously all locking fingers could be lifted to free them simultaneously; if broad guide fingers are used as in the first embodiment they advantageously make this difficult, to make accidental lifting in such manner during operation a practical impossibility.

Asymmetry in disposition of the opposed interrupted-flange and finger structure, as exemplified by the lesser number of fingers on one side in this Figure, prevents misassembly by orientation 180° out of proper phase. As indicated, upside-down orientation of the shield is made impossible by offset of the finger knob and flange structure in the axial direction.

Obviously, few locking fingers can be used, and all fingers can be locking fingers as in embodiment 600, if desired. Only one locking finger, preferably broad, will offer some degree of operability but not the optimum of balanced securance preferably provided. Two are better even if only biased interruption of the housing flanging, and better yet if in opposite locations. Four are good but more offer better reserve in either direction as backup should some accidentally be disengaged, and discourage tampering.

When guide fingers are used, one guide finger will serve to some degree, but oppositely located guide fingers are more effective in centering and plural fingers on each side guide best.

Figure 7:
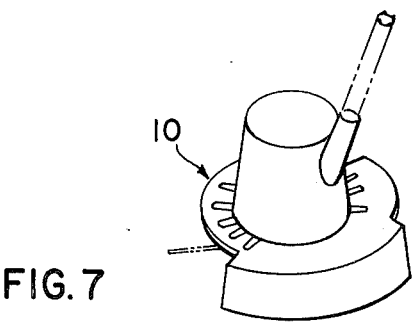
FIG. 7 is an isometric view from above of the FIG. 2 showing.

FIG. 7 shows that the slots additionally function to give an attractive appearance of the assembly from the top.

Figure 8:
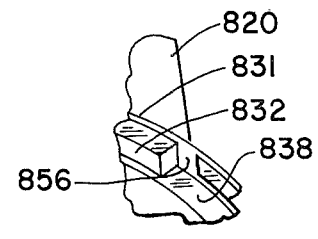
FIG. 8 is an isometric detail of a modified embodiment adapted from analogous location in the FIG. 1 showing.

FIG. 8 shows a structural provision located for preventing relative rotation of the shield and housing in the wrong direction by permitting rotation in only one direction in the form of a preferably integral stop 856, closing the space between elements 831 and 838 at one end of the flanging on one side. If desired, the same provision can be made at a diametrically opposed location in the other flanging. Proportion of the flanging structure is altered as necessary to accommodate the circumferential extent of the stop.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. A detachable locking-connection for assembly of first and second parts of a filament trimmer or the like in which one of said first and second parts is a housing and the other of said first and second parts is a shield, comprising: the first part having male flange structure with at least one interruption therein, the second part having female flange structure with at least one interruption therein located for coupling the female flange structure with the male flange structure on contact therewith and rotation relative thereto, and means for locking the first and second parts together including at least one locking finger on said second part biasable into said male flange structure interruption.

2. A detachable locking-connection as recited in claim 1, all said male and female flange structure being generally circumferentially relatable in position, said contact being in an axial direction and against said bias of said at least one locking finger, and said at least one locking finger being located in the female flange structure interruption.

3. A detachable locking-connection as recited in claim 2, all said at least one interruption of the male flange structure and said at least one interruption of the female flange structure respectively dividing the male flange structure into radially directed plural male flanges and dividing the female flange structure into radially directed plural female flanges, and said at least one locking finger biasable direction being axial.

4. A detachable locking-connection as recited in claim 3, said at least one locking finger having proportion for interfering with one of said male flanges upon said relative rotation.

5. A detachable locking-connection as recited in claim 4, said proportion including an axial extent of at least a part of said at least one locking finger.

6. A detachable locking-connection as recited in claim 5, and at least one of said locking fingers being located in each of the female flange structure plural interruptions.

7. A detachable locking-connection as recited in claim 6, plural locking fingers located in each of the female flange structure plural interruptions.

8. A detachable locking-connection as recited in claim 7, at least one guide finger located for holding all said first and second parts coaxial on said contact.

9. A detachable locking-connection as recited in claim 8, said at least one guide finger holding being a holding of a said male flange.

10. A detachable locking-connection as recited in claim 1, said contact being axial contact, the male flange structure bring outwardly radial and having a plurality of said interruptions dividing said male flange structure into plural discrete outward flanges, the female flange structure comprising an inner-perimeter structure having a plurality of said interruptions dividing the female flange structure into plural discrete inward flanges, and said at least one locking finger being inwardly protrusive at at least one of said inner perimeter structure interruptions and having length and resilience for flexing axially against one of said outward flanges on said axial contact and for biasing as said into said male flange structure interruption on said relative rotation.

11. A detachable locking-connection as recited in claim 10, at least one guide finger, said at least one guide finger being inwardly protrusive at at least one of said inner perimeter structure interruptions and having a length for guiding on the periphery of a said discrete outward flange for preserving alignment during said relative rotation.

12. A detachable locking-connection as recited in claim 11, at least two of said locking fingers, the at least two locking fingers being positionable respectively for preventing said relative rotation in a clockwise direction and in a counterclockwise direction.

13. A detachable locking-connection as recited in claim 12, each of said locking fingers having a dimension small in a circumferential direction as compared with one of said plural interruptions dividing the male flange structure.

14. A detachable locking-connection as recited in claim 13, each of said at least two locking fingers being located for biasing into one of said plural interruptions dividing the male flange structure.

15. A detachable locking-connection as recited in class 14 in which there is, a guide finger between said at least two locking fingers.

16. A detachable locking-connection as recited in claim 13, said at least two locking fingers being located for biasing respectively into separate ones of said inner perimeter structure interruptions.

17. A detachable locking-connection as recited in claim 16 in which there are, plural locking fingers located for biasing into each of said plural interruptions dividing the male flange structure.

18. A detachable locking-connection as recited in claim 17, a respective guide finger located in each of said interruptions dividing the female flange structure.

19. A detachable locking-connection as recited in claim 13, a set of three of said locking fingers located for biasing into each one of said interruptions dividing the male flange structure for providing locking finger reserve in both clockwise and counterclockwise directions of rotation, and a guide finger between each of said locking fingers in each set.

20. A detachable locking-connection as recited in claim 1, the detachable locking connection having a plurality plural of said male flange structures and female flange structures respectively in asymmetrical disposition around all said housing and shield, and a of said locking fingers, thereby assuring proper orientation of the shield relative to the housing on assembly.

21. A detachable locking-connection as recited in claim 1, said at least one locking finger having an offset contour preventing upside down assembly of the shield relative to the housing.

22. A detachable locking-connection as recited in claim 21, and a stop located for permitting relative rotation of the housing and shield in only one direction.

23. In a detachable locking-connection for attachment of a housing having circular interrupted-flange structure to a shield having interrupted-flange structure complementary to the housing circular interrupted-flange structure and proportioned for over-lapping engagement therewith, the improvement comprising: finger structure on one of said housing and shield, the finger structure being biasable in a direction axial to the housing and shield into said interruption of the flange structure of the other of said housing and shield upon said overlapping engagement, in a position preventing disengagement of said overalapping engagement.

24. The method of assembling and locking together a housing having an interrupted flange structure to a shield having an interrupted flange structure complementary to the housing interrupted flange, comprising the steps:
   (a) opposing all said housing and shield interrupted flange structures in axial alignment;
   (b) assembling all said housing and shield interrupted flange structures by relative rotation while maintaining said axial alignment, and
   (c) locking together all said housing and interrupted flange structures by axially biasing a portion of one of said housing and shield into circumferential relation with the interrupted flange structure of the other of said housing and shield.

* * * * *

UNITED STATES PATENT AND TRADEMARK OFFICE
CERTIFICATE OF CORRECTION

PATENT NO. : 4125339
DATED : November 14, 1978
INVENTOR(S) : CHARLES B. PITTINGER, SR. & CHARLES B. PITTINGER, JR It is certified that error appears in the above-identified patent and that said Letters Patent are hereby corrected as shown below:

Claim 1, line 2, delete "class" and insert --claim--;

delete "," after "is";

Claim 17, line 2, delete "," after "are";

Claim 20, line 3, delete "plural";

Claim 20, line 5 after "a" insert --plurality--;

Claim 23, line 12, delete "overalapping" and insert -- over-lapping--.

Signed and Sealed this

Twentieth Day of March 1979

[SEAL]

Attest:

RUTH C. MASON
Attesting Officer

DONALD W. BANNER
Commissioner of Patents and Trademarks